April 22, 1930.  D. WILLIAMS  1,755,976
ENGINE VALVE
Filed June 10, 1927   2 Sheets-Sheet 1
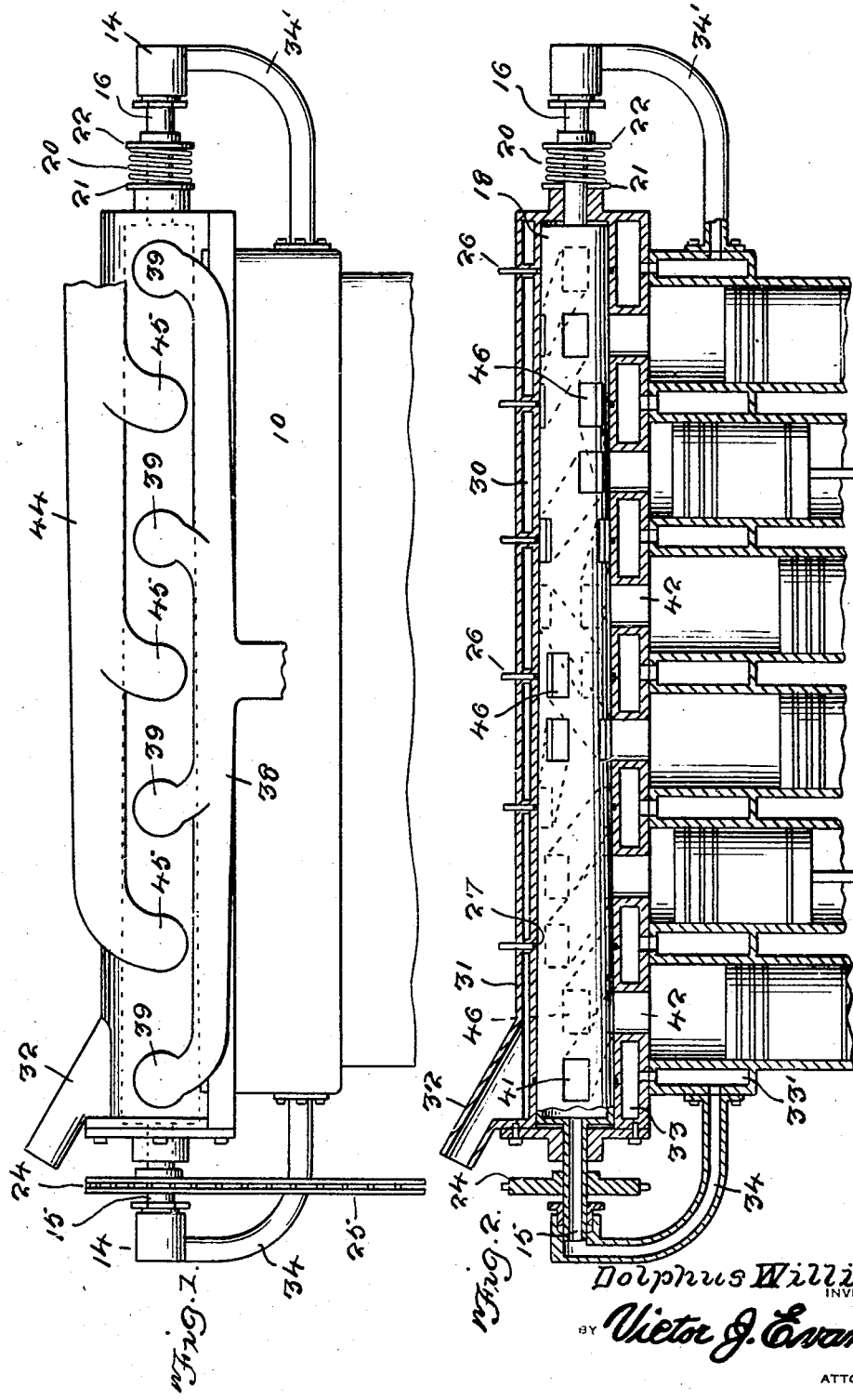
Dolphus Williams
INVENTOR
BY Victor J. Evans
ATTORNEY

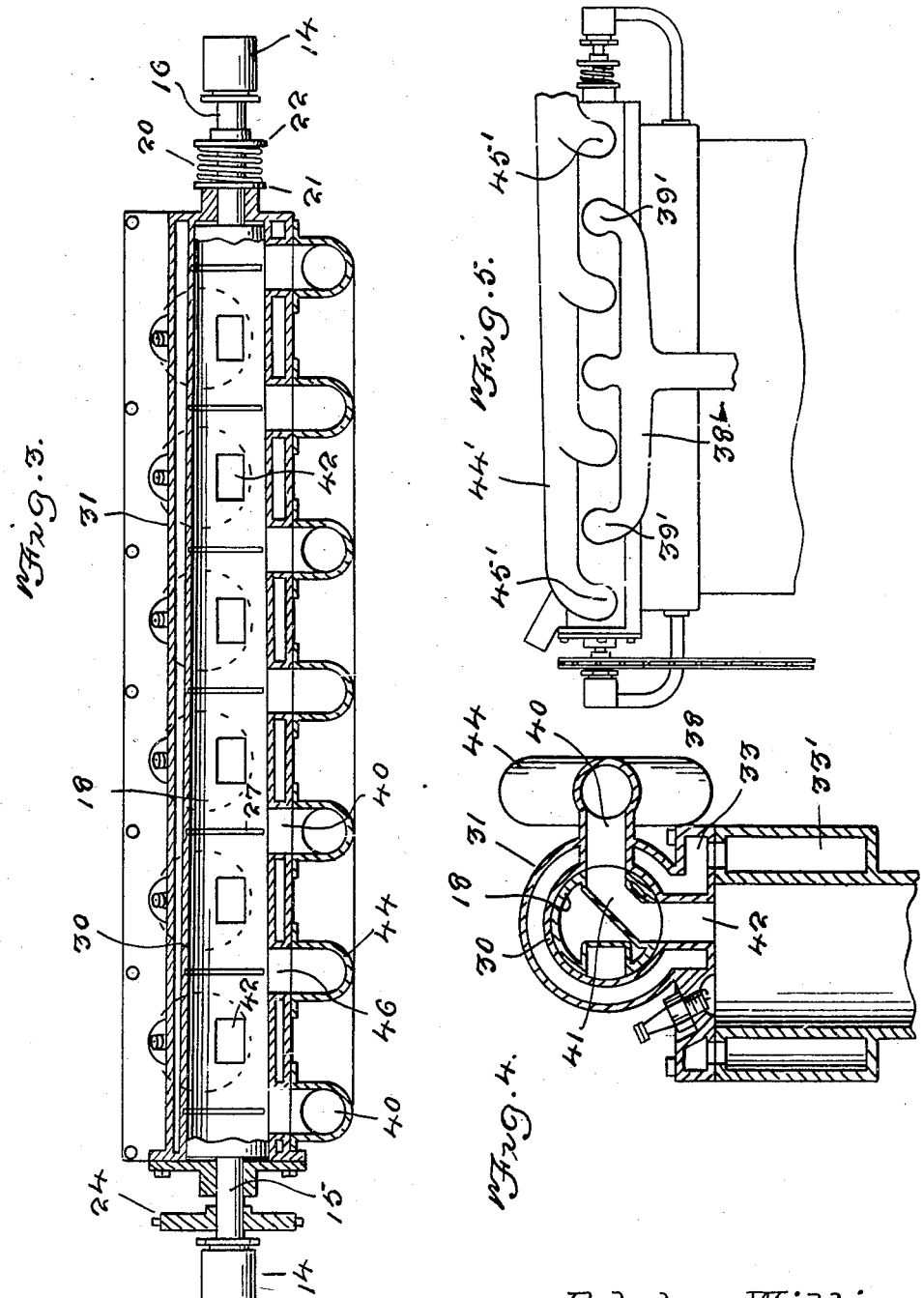

Patented Apr. 22, 1930

1,755,976

UNITED STATES PATENT OFFICE

DOLPHUS WILLIAMS, OF SANGER, CALIFORNIA

ENGINE VALVE

Application filed June 10, 1927. Serial No. 197,899.

The object of this invention is to provide a water cooled rotary valve, of special construction, designed to control the inlet and exhaust ports of an internal combustion engine, the valve being self seating, highly efficient in operation, and employing a minimum number of parts.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1 is a view in elevation showing the valve housing and manifolds, the valve mechanism being mounted directly above the cylinders or the engine body.

Figure 2 is a view in vertical longitudinal section thru the valve casing and thru the cylinders.

Figure 3 is a view in horizontal section thru the valve casing.

Figure 4 is a vertical transverse section.

Figure 5 shows in elevation a form of the construction in which an intake manifold is provided with three inlet connections for the valve casing, and the exhaust manifold is provided with four connections.

In Figure 1, the upper portion of an engine structure, is shown conventionally, and is designated 10, and arms or pipes 34, 34' carry at their upper and outer ends bearing members 14 for the tubular shaft members or axial elements 15 and 16 by which the rotary valve per se, designated 18, is mounted.

This element 18 comprises a chambered body, tapering longitudinally, and having the smaller end, at the right, as shown in Figures 2 and 3, the valve being held to seat, by means of a spring 20 bearing at one end on washer or disk 21, and imparting thrust outwardly at the other end, against disk or washer 22 carried by the shaft member 16.

Tubular shaft member 15 carries rigidly thereon a sprocket wheel, or other form of drive wheel, designated 24, and a chain or the like, designated 25, passes around this wheel, and is driven in a suitable manner for imparting drive to the rotary valve.

Oil may be admitted thru ducts or tubes, such as 26, discharging to a felt packing or the like 27, several of these packing elements being positioned as shown, with reference to the ports referred to below, and serving to properly lubricate the valve.

Grooves are provided in the valve casing 30 for the felt packing, which extends around the valve body 18 to a sufficient degree to effect the purpose intended, reducing the bearing surface, and preventing leakage at any point.

A water jacket 31 surrounds the valve 30, and a connection therefor, designated 32, is of any well known type. The water chambers 33, communicate with chambers 33', and the latter are in communication thru pipe 34, at one end, with axial valve member 15. At the opposite end pipe 34' serves a similar purpose. The water circulation is therefore from the upper water jacket 33, thru chambers 33', thru pipes 34, 34', hollow axial members 15 and 16, and thru the hollow valve body 18.

Intake manifold 38 has connection at several points, such as 39, with the valve casing, and intake ports 40 provide for the admission of fuel thru ports 41 of the valve and cylinder ports 42.

The exhaust manifold is designated 44, and the connections, such as 45, lead from the exhaust ports 46 of the valve, the latter being designed to register, at the proper intervals with engine ports 42. The relative position of the posts is such that registration will be effected at the proper time for producing the results obviously intended, it being understood that the number of cylinders in the engine may be varied as desired.

Among the advantages, are the direct and positive control of the ports by means of a single self seating valve member mounted and operating in the position producing the most satisfactory results, that is directly above the engine cylinders.

In the form of Figure 5, intake manifold 38' is provided with three inlet connections, such as 39', for the valve casing, and exhaust manifold 44' is provided with four connections such as 45'.

Having described the invention what is claimed is:—

In a device of the class described, an engine body, including cylinders, a valve casing mounted above the cylinders, the diameter of the casing gradually decreasing from one end to the other end, a tapered valve within the casing, means independent of the casing for mounting the valve and providing water circulation therethrough, means for rotating the valve, the mounting means being spaced from the casing of the valve and the engine structure and admitting the rotating means between the valve and mounting means, means imparting longitudinal thrust to the valve, for seating the latter, ports being provided between the casing and cylinders, fuel inlet means and exhaust means, the valve including ports adapted to effect successive registration, in timed relation, between the ports of the valve and the ports between the latter and the cylinders.

In testimony whereof I affix my signature.

DOLPHUS WILLIAMS.